United States Patent
Gomez Maturana et al.

(10) Patent No.: US 9,282,143 B2
(45) Date of Patent: Mar. 8, 2016

(54) METHOD FOR HANDLING DATA STORED BY A COMMUNICATION SYSTEM

(75) Inventors: Susana Gomez Maturana, Madrid (ES); Ralf Keller, Würselen (DE); Daniel Mateos Perez, Getafe (ES); Santiago Muñoz Muñoz, Madrid (ES); Enrique Ruiz Lafuente, Madrid (ES); Andreas Witzel, Herzogenrath (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 897 days.

(21) Appl. No.: 13/498,460

(22) PCT Filed: Oct. 9, 2009

(86) PCT No.: PCT/EP2009/063194
§ 371 (c)(1),
(2), (4) Date: Mar. 27, 2012

(87) PCT Pub. No.: WO2011/042064
PCT Pub. Date: Apr. 14, 2011

(65) Prior Publication Data
US 2012/0185506 A1      Jul. 19, 2012

(51) Int. Cl.
*G06F 17/30*       (2006.01)
*H04L 29/08*      (2006.01)

(52) U.S. Cl.
CPC ...................... *H04L 67/10* (2013.01)

(58) Field of Classification Search
CPC ................. G06F 17/30578; G06F 17/30867
USPC ................... 707/683; 709/207, 219, 228
See application file for complete search history.

(56) References Cited

U.S. PATENT DOCUMENTS

| | | | |
|---|---|---|---|
| 5,638,431 A * | 6/1997 | Everett et al. | 379/114.28 |
| 5,640,446 A * | 6/1997 | Everett et al. | 379/114.28 |
| 7,945,644 B2 * | 5/2011 | Kim et al. | 709/219 |
| 8,787,387 B2 | 7/2014 | Dussaume et al. | |

(Continued)

FOREIGN PATENT DOCUMENTS

| | | |
|---|---|---|
| CN | 101156415 A | 4/2008 |
| CN | 101159603 A | 4/2008 |

(Continued)

OTHER PUBLICATIONS

Search Report, application No. CN200980162818.0. 2014. SIPO, Beijing, China.
Sermersheim, J. (ed.), "Lightweight Directory Access Protocol (LDAP): The Protocol", RFC 4511, Jun. 2006. The Internet Society, Reston, VA.
3GPP Technical Specification Group Core Network and Terminals; IP Multimedia (IM) Subsystem Cx and Dx Interfaces;Signalling flows and message contents. 3GPP TS 29.228 V8.2.0 Jun. 2008. 3GPP, Sophia Antipolis, France.

(Continued)

*Primary Examiner* — Baoquoc To
(74) *Attorney, Agent, or Firm* — Coats & Bennett, PLLC

(57) ABSTRACT

Method, apparatuses and computer programs for handling data related to users of a communications system comprising: a database server storing data related to users of the system, and a plurality of service servers. The database server modifies (1103) a first data stored therein for a user according to a received request (1101), and sends a second message (1109) notifying the data modification to a first service server comprising: an identifier of the user, the first data after the modification, and an identifier of a second service server of the system that handle data related to the user. The first service server sends a third message (2105) to the second service server requesting to modify a data held therein in relationship with said user. Features of the invention help in reducing signaling in layered systems, since additional data are communicated in the second message.

18 Claims, 5 Drawing Sheets

(56) References Cited

U.S. PATENT DOCUMENTS

| | | | | |
|---|---|---|---|---|
| 2004/0088734 A1* | 5/2004 | Donlan et al. | | 725/109 |
| 2004/0088737 A1* | 5/2004 | Donlan et al. | | 725/135 |
| 2004/0156487 A1* | 8/2004 | Ushiki | H04L 67/18 | |
| | | | | 379/88.22 |
| 2005/0141482 A1* | 6/2005 | Kleiner | | 370/352 |
| 2005/0201723 A1* | 9/2005 | Islam et al. | | 386/52 |
| 2006/0155778 A1 | 7/2006 | Sharma et al. | | |
| 2006/0251239 A1* | 11/2006 | Taylor | H04L 29/12047 | |
| | | | | 379/355.04 |
| 2009/0247118 A1* | 10/2009 | Aaltonen et al. | | 455/405 |
| 2010/0035608 A1* | 2/2010 | Zhu et al. | | 455/433 |
| 2010/0131615 A1* | 5/2010 | Kim et al. | | 709/219 |

FOREIGN PATENT DOCUMENTS

| | | |
|---|---|---|
| CN | 101267649 A | 9/2008 |
| EP | 1965319 A2 | 9/2008 |
| WO | 2009012810 A1 | 1/2009 |

OTHER PUBLICATIONS

3GPP Technical Specification Group Core Network and Terminals; Cx and Dx interfaces based on the Diameter protocol; Protocol details (Release 8); 3GPP TS 29.229 V8.2.0, Jun. 2008. 3GPP, Sophia Antipolis, France.

3GPP Technical Specification Group Core Network and Terminals; 3GPP system to Wireless Local Area Network (WLAN) interworking; Stage 3 (Release 7). 3GPP TS 29.234 V7.9.0. Jun. 2008. 3GPP, Sophia Antipolis, France.

3GPP Technical Specification Group Core Network and Terminals; IP Multimedia (IM) Subsystem Sh interface; Signalling flows and message contents (Release 8). 3GPP TS 29.328 V8.1.0. Jun. 2008. 3GPP, Sophia Antipolis, France.

3GPP Technical Specification Group Core Network and Terminals; Sh Interface based on the Diameter protocol; Protocol details (Release 8). 3GPP TS 29.329 V8.1.0. Jun. 2008. 3GPP, Sophia Antipolis, France.

* cited by examiner

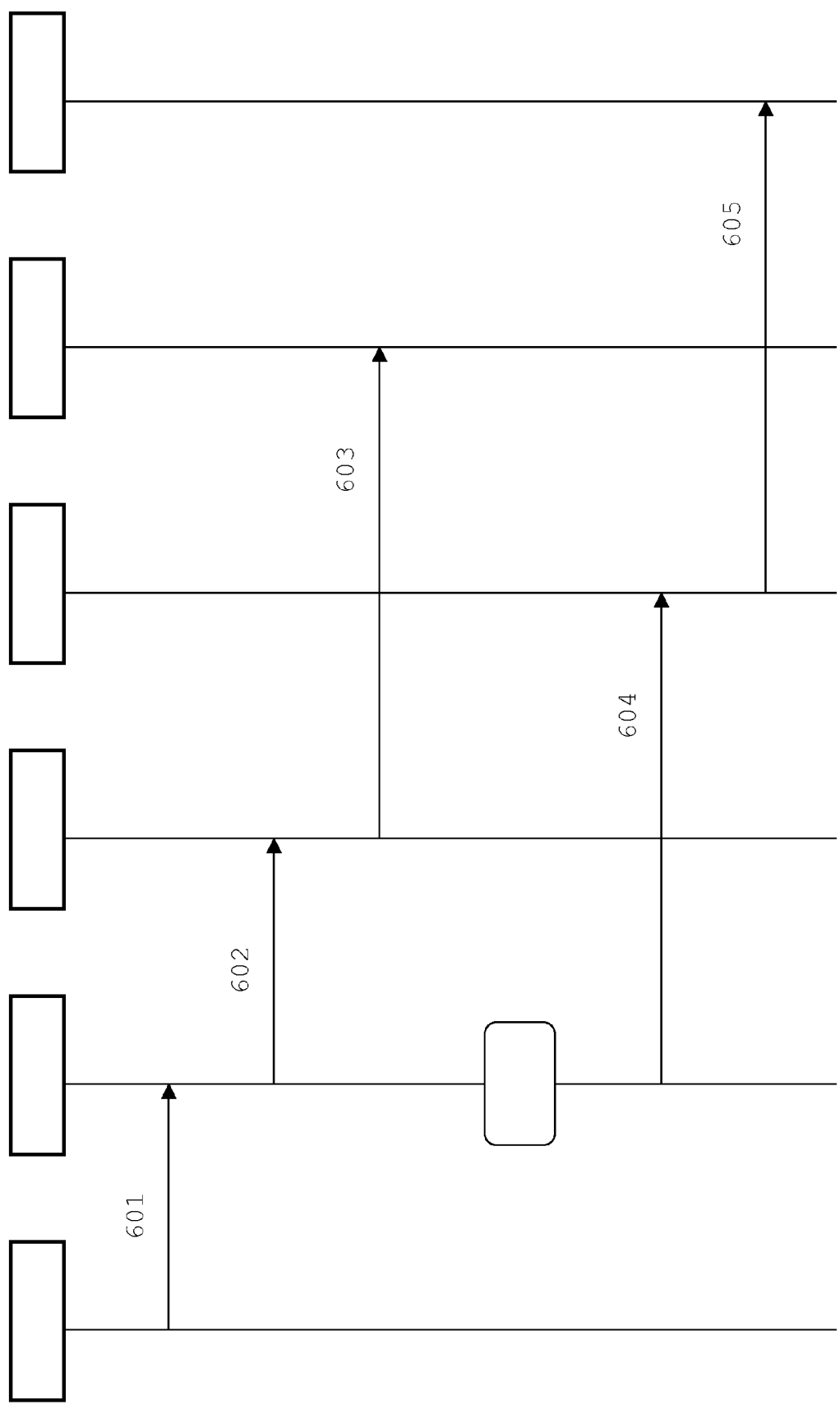

METHOD FOR HANDLING DATA STORED BY A COMMUNICATION SYSTEM

FIELD OF THE INVENTION

The present invention relates to methods, apparatuses and computer programs for handling data related to users of a communications system comprising: a database server storing data related to users of the system, and a plurality of service servers providing services to said users making use of these data.

BACKGROUND

Traditionally, communications systems have offered services to their users by using monolithic service servers. The term monolithic server refers to a kind of apparatus comprising processing and data storage capabilities that allows it to process the signaling it can receive, as well as the signaling to be sent, by using data it stores internally. In other words, a monolithic server is arranged to serve a certain service by using its internal processing means and by using the data it stores internally.

However, factors such as scalability, and performance or deployment/implementation costs, are starting to drive towards another kind of solution, wherein the functionality provided by some monolithic servers is—say—"tiered" resulting into a layered architecture. The principle behind this kind of solution (hereinafter also referred as "data layered architecture", DLA) consists on decoupling, along different servers, the service logic processing functions from the mere data storage functions.

A data layered architecture, DLA, is a physical infrastructure that comprises, en essence: a database server (DBS) acting as a back-end storage system, and a plurality of servers which access the DBS for obtaining and/or modifying data stored therein so as to provide the services they respectively serve. Depending on factors, such as: the amount of data to be stored, the required access availability, data distribution/replication policies, etc; the DBS can comprise one database, or a plurality of databases (e.g. implemented along separated machines). In any case, the principle of decoupling the service logic processing from the mere data storage allows using commercially available robust DBS products, which can act as a reliable back-end storage in DLA implementations, rather than devising costly proprietary (monolithic) products having to cope with, both: high message signaling processing capabilities for processing the service(s) they serve according to the specific service(s) logic, and high capacity/resiliency in what regards to data storage capabilities.

Moreover, since the same DBS can be used as a back-end data storage for a plurality of service servers serving the same or different services, the total signaling due to a particular service in a communications system can e.g. be distributed along a plurality of similar service servers adapted for serving said particular service and adapted also to DLA architecture (e.g. using any suitable load balancing mechanism), which should then act as signaling/processing front-ends. This allows reducing even more the cost for producing and/or maintaining such a kind of servers, since the processing load per server can be diminished, as the total signaling due to a certain service can be divided among the available (front-end) servers. Furthermore, this provides also scalability advantages for the operator of a communications system, since it can adjust the number of (DLA adapted) service servers according to the signaling demands for a given service and, thus, reduce its operational and capital expenditures.

Accordingly, the service servers which are more likely envisaged to be adapted according to a DLA are those that, given the specific characteristics of the service(s) they serve, have to stand with a high rate of signaling messages, and/or that are required to handle a huge number of data, so as to provide said service(s). The cost for producing and/or maintaining these servers can thus be reduced, since their complexity can be diminished, as they are not required to have high processing capabilities and, at the same time, high storage capabilities.

Examples of service servers which are envisaged to be adapted according to a DLA are, among other: Home Location Registers (HLR), Home Subscriber Servers (HSS). Other kind of servers can be, for example, servers providing (e.g. through web browsers) a plurality of users with web-based applications such as: calendar services, bank/financial services, personalized data storage services, etc; wherein the data they need for their service operation relating to the served users are stored in a back-end storage system (DBS).

For example, a HLR server adapted to a DLA architecture can then comprise signaling and processing means for processing e.g. Mobile Application Part (MAP) messages to/from Mobile Switching Centers/Visitor Location Registers (MSC/VLRs) or Serving GPRS Support Nodes (SGSNs), whilst the data it would need for such a processing (e.g. user's data of a user relating to circuit-switch CS and/or packet-switch PS domains for the concerned user/s, such as: user and/or terminal identifiers, location information, supplementary service data, service barring data, etc) should be accessed from a back end DBS, which could also store data of other kind of service servers (e.g. HSSs, web servers, authorization/authentication AAA servers, etc). Similarly, for example, a HSS server adapted to DLA can comprise signaling and processing means for processing e.g. DIAMETER (IETF RFC 3588) signaling to/from Call Session Control functions (CSCFs) and Session Initiation Protocol SIP Application Servers (ASs), whilst the data it would need for such a processing (e.g. the so called "User Profile" data for the concerned user/s) in relationship with IP Multimedia domain IMS could be accessed from the same back end DBS as the one used by HLR servers, or other kind of service servers.

A further advantage of DLA is that, in a communications system comprising a number of service servers providing services to a plurality of users, it is not required all these servers to be adapted to DLA features, but only some of them. For example, in case of a communication system comprising an IP Multimedia domain (IMS), HSS servers of the system can be adapted to DLA, whilst CSCFs (and/or AASSs in some cases) can continue being—say—"monolithic" service servers handling (i.e. storing and accessing for use) locally the data they need to use for providing their respective service. Similarly, in case of a mobile communication system comprising e.g. GSM circuit-switch CS and/or packet-switch PS domains (GSM/GPRS), HLR servers of the system can be adapted to DLA, whilst other service servers, such as MSC/VLRs, SGSNs, etc continue being "monolithic" in the same sense as described above.

It is to be noticed that service servers such as: CSCFs, MSC/VLRs or SGSNs, handle data of a given user on a temporary basis (i.e. locally store and use data of some users while these users are registered and served through them). As opposed, other service servers, such as HSSs, HLRs, or other kind of subscriber servers, are intended to hold on a permanent basis the—say—master copy of some of these data (i.e. data held locally and temporarily on CSCFs, MSC/VLRs, etc), as well as data related to other users (e.g. not registered users), either: stored locally (i.e. in monolithic implementations), or accessed in a back-end DBS. This circumstance (i.e. temporary handlers of data versus master handlers) can also appear in other kind of communications systems, which can also benefit of adapting accordingly at least part of its network infrastructure to DLA.

When coming to data provisioning, DLA might also offer further advantages. For example, in a system comprising only monolithic service servers, when some data related to a user is/are to be modified (e.g.: initially set, altered its current content, or deleted), the provisioning server is required to be configured with (or the operator of a provisioning/management terminal is required to know) the specific service server(s) which is(are) concerned by the data in question, so as to send message(s) requesting the corresponding data modification to the server(s). Moreover, service servers in monolithic implementations usually trend to offer heterogeneous provisioning interfaces, some times being proprietary (i.e. not standardized signaling interfaces). On the other hand, a system arranged according to DLA might offer a single point for data provisioning; namely, the DBS. Furthermore, commercially available DBS products usually offer well-known/standardized signaling interfaces, such as LDAP ("Light-weight Directory Access Protocol", IETF RFC 4511), which are used by its clients for reading and modifying data stored therein, and which can be used also for data provisioning purposes. These features could help to simplify the provisioning process, diminish the message signaling due to provisioning, and also prevent errors, since the back end DBS of a DLA can provide a single point of access and administration for the data related to a plurality of users. Nevertheless, performing data provisioning directly on the DBS brings about some problems. For example, the server sending provisioning orders (or the human operator handling said server) would be required to predetermine in some cases the impact of a certain data modification on some further related data. In DLA architectures, this has caused provisioning solutions that involved sending first the provisioning orders (i.e. requests to modify some data) to the corresponding front-end(s), and initiating then interactions between the front-end(s) and the DBS so as to store therein the data modification(s) involved by the provisioning order.

Moreover, a characteristic inherent to DLA is that external signaling trend to increase for some servers, as they need to communicate with the DBS for obtaining the data they require to provide their respective services, and also to update these data when needed. Further, since temporary copies of some of these data can be scattered along further service servers (e.g. that keep temporarily copies of the data), more external signaling can be required so as to keep data consistency when some of these data undergo a modification in the DBS. External signaling relies, in addition to the performance of the involved servers, on network elements, such as: routers, bridges, gateways, etc; and also on the bandwidth capacity provided by these elements, which can vary due to other kind of signaling traffic (e.g. not merely due to DLA related traffic), and which can finally affect the performance of the communications system.

It should be therefore desirable to provide solutions that allow, at least partly, diminishing the external signaling in DLA infrastructures, without compromising their inherent benefits.

SUMMARY

Aspects of the invention relate to method, servers, and computer program products, as claimed in the independent claims. Embodiments of the invention are set out in the dependent claims.

When the database server modifies a first data stored therein for a user according to a received request, it sends a message notifying the data modification to a first service server. The message from the database server contains: an identifier of the user, information relating to the first data after the modification, and an identifier of a second service server that handle data related to the user for providing a service to said user. The data in said message can be used by the first server for further processing the data modification without further querying to the database server for obtaining additional information. The first service server then uses the data received in the message from the database server for sending a further message towards the identified second service server comprising an identifier of the user and requesting to modify a data held therein in relationship with said user.

According to one embodiment, the message from the database server can also comprises: information relating to the first data before the modification, and/or information relating to the type of data operation that requested the data modification in the database server, and/or information relating to further second data, stored in the database server in relationship with the user, which was/were not affected by the modification.

The data included in the message sent from the database server helps the first server to determine how to process the outcome of the data modification that took place in the database server with regard to the impacts in further service servers that provide services to said user. According to embodiments of the invention, the first server can use any of these data to determine whether to send the further message to a second service server, and/or to select a particular protocol for sending said message.

By including in the message from the database server additional data related to a given first data that has been modified, further eventual signaling between service servers and the database server can be diminished. This is particularly useful when, for evaluating the impact that a particular data modification over a given data may have on a service provided to a concerned user, or for further processing the data modification, it is necessary for a service server to access and check further data of the user, and the service server that implement such a service logic does not store these data locally. Moreover, the database server needs not be aware about the semantics of a given data with regard to a given service, nor about the impacts a data modification might have on certain service servers, since a simple link stored in the database server between a given data and a further related data can be used to determine which data have to be sent towards a service server upon a modification of said given data.

According to one embodiment, wherein the communications system comprises a first and a second network domain, and wherein the first data belongs to data of the user in the first domain, the invention further comprises: converting the modified first data to a format according to the second domain, and storing by the database server the converted modified first data. Among other, this feature allows synchronizing similar services provided to the same user in different network domains, whilst diminishing the necessary signaling, since data changes requested to data related to a first domain can cause, without a further explicit data change request to the database server, data changes to be performed also to data related to a second domain.

The first and second network domains can comprise, respectively, at least one of: a mobile network circuit-switch CS domain, a mobile network packet-switch PS domain, and an Internet Protocol Multimedia Subsystem domain IMS.

BRIEF DESCRIPTION OF THE DRAWINGS

FIG. 6 illustrates a simplified signaling flow between some servers of FIG. 1 according to one embodiment of the invention.

DETAILED DESCRIPTION

Exemplary embodiments of the invention shall now be described with reference to FIGS. 1 to 6.

Figure 1:
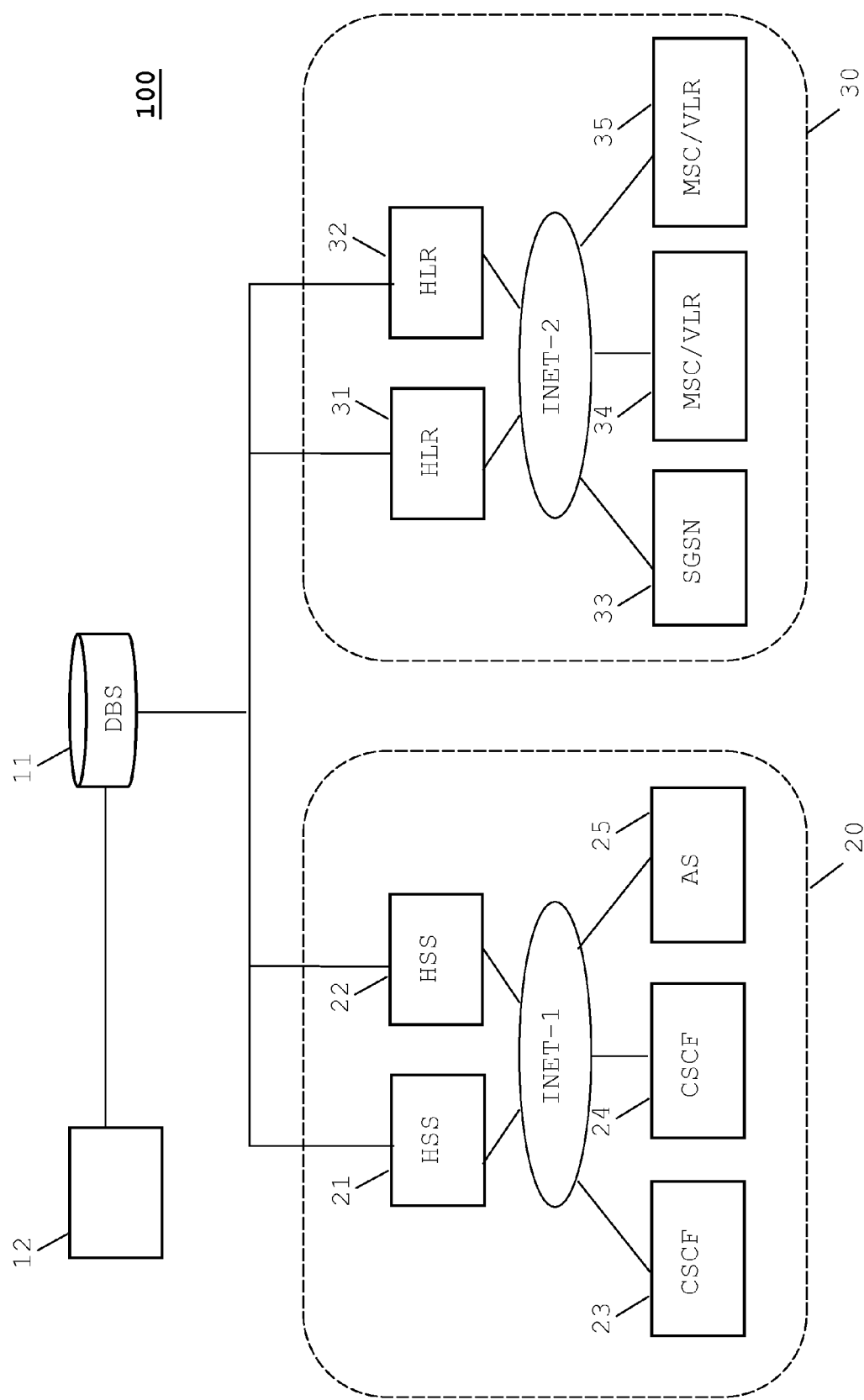
FIG. 1 illustrates a communications system according to one embodiment of the invention.

The system of FIG. 1 illustrates schematically some servers of a communications system, 100, comprising two network domains 20, 30; wherein some of the service servers (21, 22, 31, 32) have been adapted to a data layered architecture DLA.

In the example of FIG. 1, and for illustration purposes, it is assumed that network domain 20 comprises an "Internet Protocol Multimedia Subsystem" IMS, such as described in 3GPP Specification TS 23.228 V8.8.0 (March-2009; http://www.3gpp.org/ftp/Specs/archive/23 series/23.228/23228-880.zip), and network domain 30 is assumed to comprise a circuit-switch and packet switch cellular system, such as described in GSM Specification TS 100.522 V7.1.0 (January 2000; http://www.3gpp.org/ftp/Specs/archive/03_series/03.02/0302-710.zip). Both domains can belong to the same or different operators, which benefit from DLA features by storing in a common database system repository (DBS, 11) data of its/their users that can be used by service servers of the system 100 to provide them with communication services.

Further servers that usually exist in communications systems comprising such a kind of domains (20, 30), as well as details related to access networks that provide connection to the terminals of the users to these servers, some of which can be common for different network domains, are not shown in the simplified illustration of FIG. 1 for the sake of clarity.

According to the example illustrated in FIG. 1, network domain 30 comprises, in turn, two network (sub)domains: a circuit-switch CS and a packet-switch PS domains; wherein, as it is well known by the skilled person, some access network elements and service servers (e.g. HLRs) are common to both CS and PS. In domain 30, MSC/VLRs 34 and 35, as well as SGSN 33, can be assumed to be traditional monolithic servers, in the sense that they handle locally (i.e. store and access locally) data of certain users, so as to use these data to provide their respective services to these users. For example, MSC/VLR 34 provide, among other, call control services for voice calls to users having their terminals registered through it for circuit-switched based services. In turn, SGSN 33 provides packet connection control services for certain users having their terminals registered through it for packet-switched based services. As well known by those skilled in the art, some of the data held locally by MSC/VLR 34 and SGSN 33 with regard to the users they serve are provided by the corresponding HLR (e.g. HLR 31 or HLR 32).

Service servers CSCF 23 and 24, as well as AS 25, can also be assumed to be monolithic servers. For example, CSCF 23 can implement the role of "Serving"-CSCF, S-CSCF, and provide multimedia session control services for multimedia sessions initiated or terminating by users having their terminals registered through it in the IMS domain 20. In turn, AS 25 can be a SIP Application Server which cooperate with CSCF 23 and 24 (e.g. if they are S-CSCFs) so as to control the execution of some services available for multimedia sessions (such as forwarding incoming sessions). For accomplishing with their respective functions, S-CSCFs (e.g. 23, 24) and ASs (e.g. 25) store also locally data related to certain users, which are used respectively in these servers to provide certain service(s) to these users. In a similar manner as in the case of network domain 30 described above, in a IMS network domain 20 some of the data held by CSCFs and ASs are provided by—say—home servers, which in the particular case of IMS are called Home Subscriber Servers, HSS (e.g. HSS 21 or HSS 22).

It is to be noticed that, although the HSS is described in some 3GPP specifications as a functional entity encompassing, both: the HLR functionality for circuit-switch CS services (e.g. basic GSM voice services) and packet-switch PS services (e.g. basic GPRS services), and the corresponding home server functionality for IMS services; they do not preclude splitting the total functionality into different servers for, respectively, serving HLR and HSS specific services, mainly when the signaling interfaces and related service logic can differ (e.g. MAP protocol for communications between HLR and MSC/VLRs and SGSNs, and DIAMETER protocol for communications between HSS and CSCFs and ASs in IMS domains). In this respect, some network operators can find useful to keep working their—say—legacy HLR for their existing circuit-switch/packet-switch cellular network domains (e.g. GSM, GPRS), while acquiring new service servers implementing HSS IMS specific functions as long as they develop their IMS network infrastructures. This is the example considered herein for illustration purposes.

The features provided by DLA fits appropriately for this situation, since HSS servers, e.g. adapted to IMS only, can be deployed as—say—processing front ends, using a common back-end data repository, such as DBS 11, as long as the number of IMS subscribers of an operator grows. Similarly, when coming to replace legacy (e.g. monolithic) HLRs, and/or when scaling up the HLR processing capacity, HLR front end servers (e.g. 31, 32) can be deployed also as—say—light weight processing only machines (i.e. signaling processing front-ends), which can then use a common back-end data repository (DBS 11). Also, a processing front end can be suited to serve more than one application service type (e.g. HLR and HSS applications).

The example illustrated in FIG. 1 considers that, both: HLR service servers in domain 30 (31, 32), and HSS service servers in domain 20 (21, 22), are adapted to DLA, so that they do not permanently store the data of the users they need to provide their respective services, but these data are instead stored in a back end data repository, such as database storage system, DBS 11. Other service servers that provide services to the users of system 100 (such as 23, 24, 25, 33, 34, 35) can, for this purpose, communicate with HSS and HLR servers (21, 22, 31, 32) through one or more inter-connection networks and network elements, such as load balancers, routers, etc, illustrated schematically with references INET-1 INET-2). The illustrated example considers also servers 21, 22, 31 and 32 as specialized servers, wherein servers 21 and 22 comprise processing and signaling means for serving HSS services, whilst servers 31 and 32 comprise processing and signaling means for serving HLR services. However, other cases wherein a single server is arranged to serve both kind of services (i.e. HLR and HSS) can also be envisaged.

Generally speaking, HLR servers for CS and/or PS services, and HSS servers for IMS only, are subscriber data servers that provide similar kind of services for the users of a communication system. Namely, they intervene in the authentication and registration process of terminals of these users, behave as the master handler of the user-related data (e.g. subscription profile data), and also act as "location functions" for terminating communications (e.g. terminating calls, terminating multimedia sessions, etc) by providing the identifiers of the corresponding service servers assigned to serve the control of communications for the registered terminals of the concerned users (e.g. MSC/VLR, S-CSCF, etc).

Accordingly, if a user subscribed to IMS services provided by the operator of network domain 20 registers his terminal into this domain, a S-CSCF (e.g. 24) will query a HSS front end (21 or 22, e.g. on a load-balancing basis) for obtaining the concerned user data (usually known as "service profile"). In this process, the HSS (21 or 22) will retrieve from the DBS 11 the corresponding data, will process them, and, if the outcome is positive (e.g. if the registration is allowed), will send the necessary data to the S-CSCF (24) so that it can store it locally and use them for serving further services to said user through said terminal accordingly. In the same manner, if a user subscribed to circuit-switch services provided by the operator of network domain 30 register his terminal into this domain, a HLR of this domain (e.g. 31 or 32) will download into the concerned MSC/VLR (e.g. 34) the corresponding data related to said user, so that said MSC/VLR can provide its services to said user through said terminal based on these data.

FIG. 1 also illustrates a provisioning server (PS, 12) adapted to interact directly with the DBS 11 so as to perform data provisioning tasks in relationship with the users subscribed to system 100; either or both, to services provided from the IMS domain 20 and/or to services provided by the CS/PS domain 30. The provisioning server 12 can be arranged to communicate e.g. via LDAP with DBS 11 for setting, changing and/or deleting data related to the users of network domains 20 or 30. For example, if a user acquires a subscription to any of the domains of system 100, or if some data of an already subscriber user is to be modified (e.g. a new user identifier is to be added, deleted or changed), the provisioning server preferably communicates with the DBS 11 for requesting the necessary data modification therein.

For the sake of illustrating embodiments of the invention, the foregoing description considers the case of a user having a subscription for cellular voice (circuit-switch, CS) and/or data packet (packet-switch, PS) based services, which are provided by service servers in network domain 30, and for IP multimedia services IMS, which are provided by service servers in network domain 20.

Figure 2:
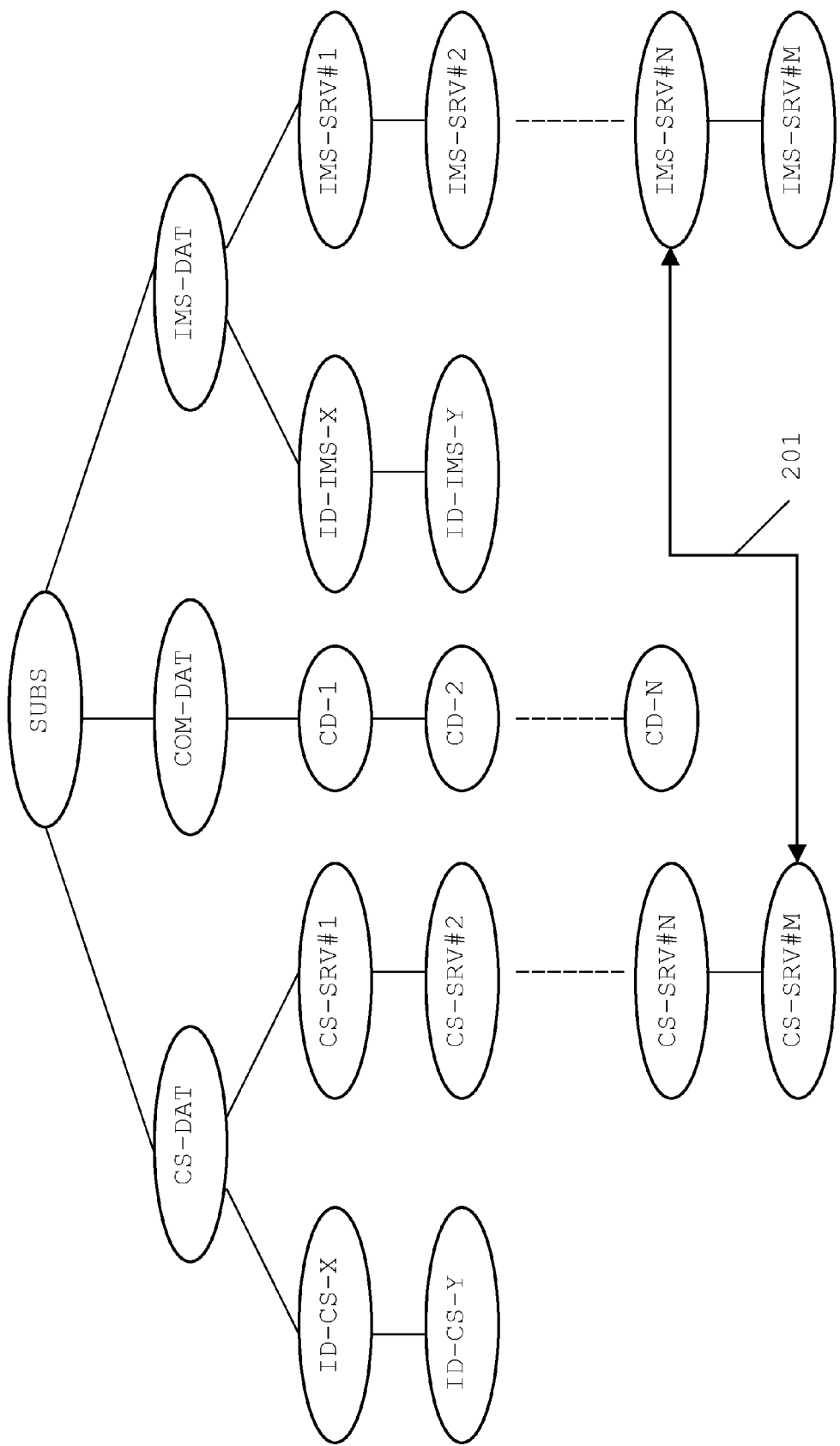
FIG. 2 illustrates schematically the structure of data related to a user in a first network domain and in a second network domain according to one embodiment of the invention.

The FIG. 2 illustrates schematically an example of logic tree structure of data related to users subscribed to, e.g., CS and IMS services provided through network domains 30 and 20. As referred earlier, the corresponding—say—master copy of these data is stored in DBS 11, which can be arranged as a LDAP directory storing and relating directory entries and corresponding data attributes (i.e. name/description of the data attribute, and corresponding data value) according to a logic tree naming/addressing schema as illustrated in FIG. 2, and wherein the cooperating service servers (e.g.: 12, 21, 22, 31, 32) send messages to the DBS requesting data operations according to LDAP protocol to modify data stored therein. The IETF RFC 4512 "LDAP Directory Information Models" (e.g. chapter 2.2) provides a description on the data entries and corresponding data attributes for LDAP. Example of data operations which modify data held by a DBS adapted to LDAP are: LDAP "Modify Operation", LDAP "Add Operation" or LDAP "Delete Operation". For example, data related to a certain user (SUBS) can be assigned to a logic data structure (mapping to directory entries in DBS 11, with their corresponding attributes) that comprise: data related to the CS domain (CS-DAT), data related to the IMS domain (IMS-DAT), and some further data (COM-DAT) which do not relate specifically to a specific network domain, and/or which are common for both, such as charging or quality of service policy data, roaming restrictions, geographical positioning information, etc, (CD-1, CD-2 . . . , CD-N).

For example, data of a certain user used by the service servers of the CS domain (CS-DAT) can comprise, among other, one or more identifiers (ID-CS-X, ID-CS-Y) of the user usable in the CS domain; such as: a Mobile Subscriber ISDN Number, MSISDN, or an International Mobile Subscriber Identity, IMSI. With regard to data related to e.g. supplementary services provided by the CS domain (CS-SRV#1, CS-SRV#2 . . . , CS-SRV#N, CS-SRV#M) which are usable by service servers on said domain, data of said user can comprise, for example, call forwarding information (e.g. comprising activation status and, if proceed, forwarding to destination identifier/s).

In turn, data of said user related to IMS, if subscribed, (IMS-DAT) can comprise, among other, one or more user identifiers assigned to said user and usable by the service servers of the IMS domain (ID-IMS-X, ID-IMS-Y); such as: one or more Private User Identifiers taking the form of NAI (Network Access Identifier, or one or more Public User Identifiers taking the form of SIP-URI (Session Initiation Protocol-Uniform Resource Identifiers). With regard to data related to services provided by the IMS domain (IMS-SRV#1, IMS-IMS#2 . . . , IMS-SRV#N, IMS-SRV#M) which are usable by servers on said domain, data of said user can comprise, for example, the so called Initial Filter Criteria, IFC, as defined by 3GPP Specification 29.228 V8.5.0 (March-2009), which are used, among other, to determine whether an incoming SIP session for said user is to be forwarded towards a certain destination.

Data of a user related to the CS domain (CS-DAT), as well as data related to the IMS domain, can also comprise further data not shown for simplicity on FIG. 2. For example, identifiers of the service servers which, in a certain moment, are assigned to serve said user and which, for said purpose, handle locally (CS or IMS) data of said user; such as MSC/VLR and/or S-CSCF identifiers.

The well-known logic structure illustrated in a simplified manner by FIG. 2 can be further enhanced to accomplish with an advantageous embodiment of the invention, e.g. by linking within the DBS 11 certain data belonging to the first domain (e.g. CS) with certain data belonging to the second domain (e.g. IMS), as illustrated by 201. Preferably, the linked data belong respectively to services on both domains having a similar functionality. For example, if CS-SRV#M represents on the logic directory tree of a user (SUBS) the information relating to call forwarding service, a link 201 can advantageously be established in the DBS 11 with the "Initial Filter Criteria" IFC data of said user governing the IMS service that, if activated, will forward an incoming SIP session addressed to an identifier of said user towards a terminating party under certain conditions (i.e. as determined by the IFC content), such as IMS-SRV#N. Similarly, the linked (102) data (CS-SRV#M and IMS-SRV#N) could, respectively, represent data relating to the activation/deactivation status of services for barring incoming calls for a terminal of the user registered in the CS domain, and barring of incoming SIP sessions for a terminal registered for said user in the IMS domain.

Commonly, service related data of a user in different network domains differ on format and content, which are respectively adapted for the service servers on the different domains. Using the example case of forwarding voice calls on a CS domain of a GSM network and SIP sessions on a IMS, the format of these data can differ substantially. For example, in the CS domain a single bit on CS-SRV#M can store information on whether (yes/not) call forwarding service is activated, and e.g. an alphanumeric array can store (if activated) the MSISDN destination. In turn, in the IMS domain, the structure of the IFC can comprise: data for analyzing the content of an incoming SIP "INVITE" message, an identifier of the Application Server AS where to forward said message for further treatment, etc. Generally speaking, the differences regarding format of the data of a user related to (and usable by) respectively a first and a second domain can comprise, for example, different coding format for these data; such as using a ASN-1 based coding for data related to a first network domain, and a XML based coding for a second network domain.

The link 201 can be used to determine whether a modification made on the DBS 11 over e.g. a data entry and/or attribute(s) on a data entry storing certain data of a user (e.g. CS-SRV#M) might have an impact on other data of said user (e.g. IMS-SRV#N). In particular, the existence of a link 201 between a first data of a user related to a first network domain (CS-SRV#M), and second data of said user related to a second network domain (IMS-SRV#N), can be used to determine a modification to be made over the second data upon a modification made, or requested, over the first data, and vice versa, as well as to perform the corresponding format conversion, if necessary.

These useful features can alleviate an end user of having to request activation or deactivation of similar services on different network domains. For example, if a user does not want to be disturbed by any incoming communication (e.g. GSM voice and IMS SIP sessions) and wants to bar all of them, and/or if he wants all his incoming communications via GSM and IMS to be diverted to his office phone, or want to deactivate any of these services, currently, he is required to run activation/deactivation procedures separately before both domains.

In such a case, the invention provides a solution to a user for running an activation/deactivation procedure before only one of the concerned network domains, which would suffice for setting the necessary data in all the concerned domains, as long as the link 201, and the corresponding functionality described herein, is established in the DBS 11 for the corresponding data. Similarly, in case data related to these services, or other data, are to be set by provisioning (e.g. via a provisioning server 12), this embodiment allows simplifying the process since, following the example above, a provisioning server 12 would only need to send a message to the DBS 11 requesting modifying data only related to one of network domain (e.g. to modify CS-SRV#M), wherein the corresponding related data (e.g. IMS-SRV#N) would get subsequently modified without any further explicit request by the provisioning server 12 to the DBS 11. Further details of this conversion feature will be disclosed later.

Figure 3:
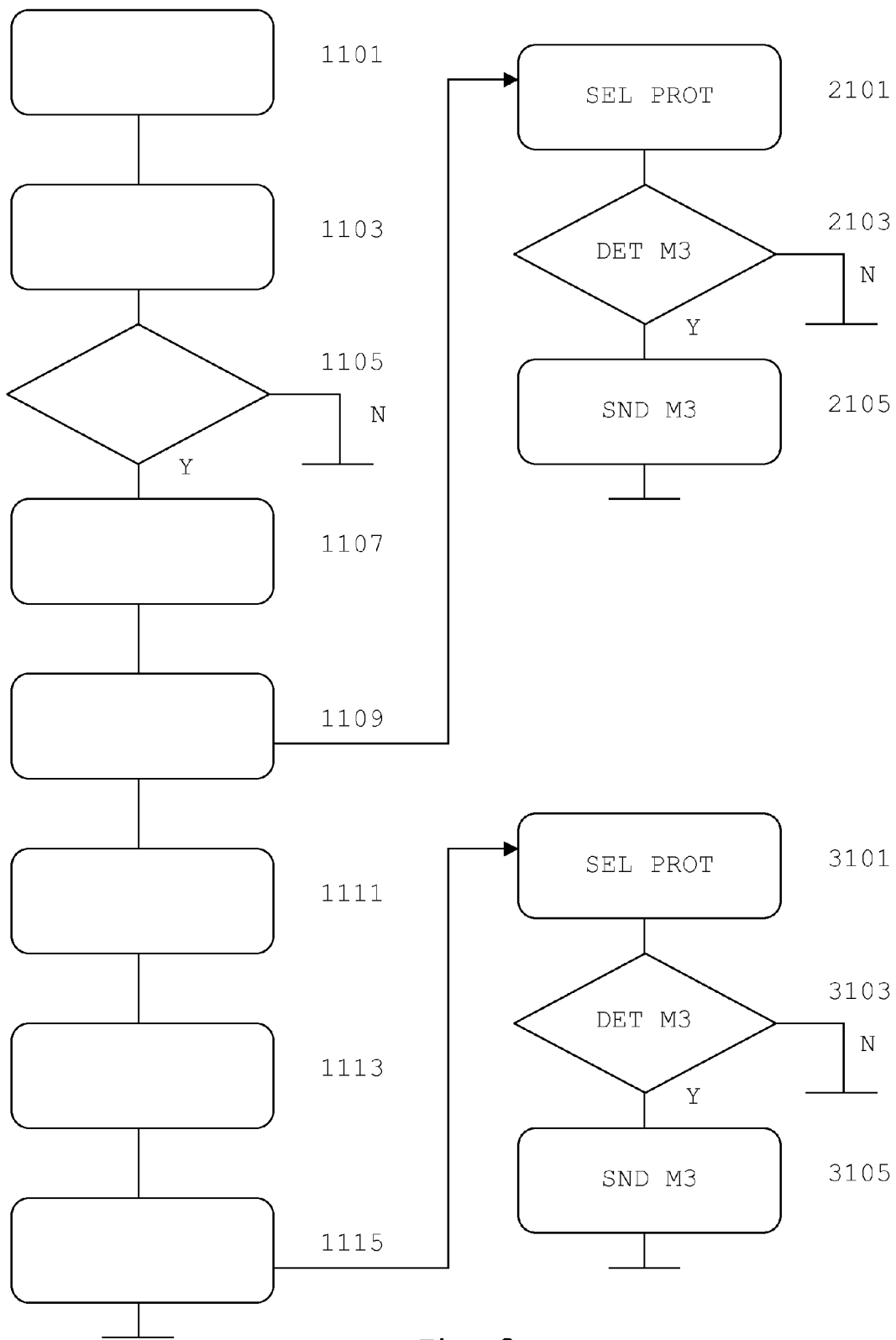
FIG. 3 illustrates steps of a method according to embodiments of the invention.
Figure 4:
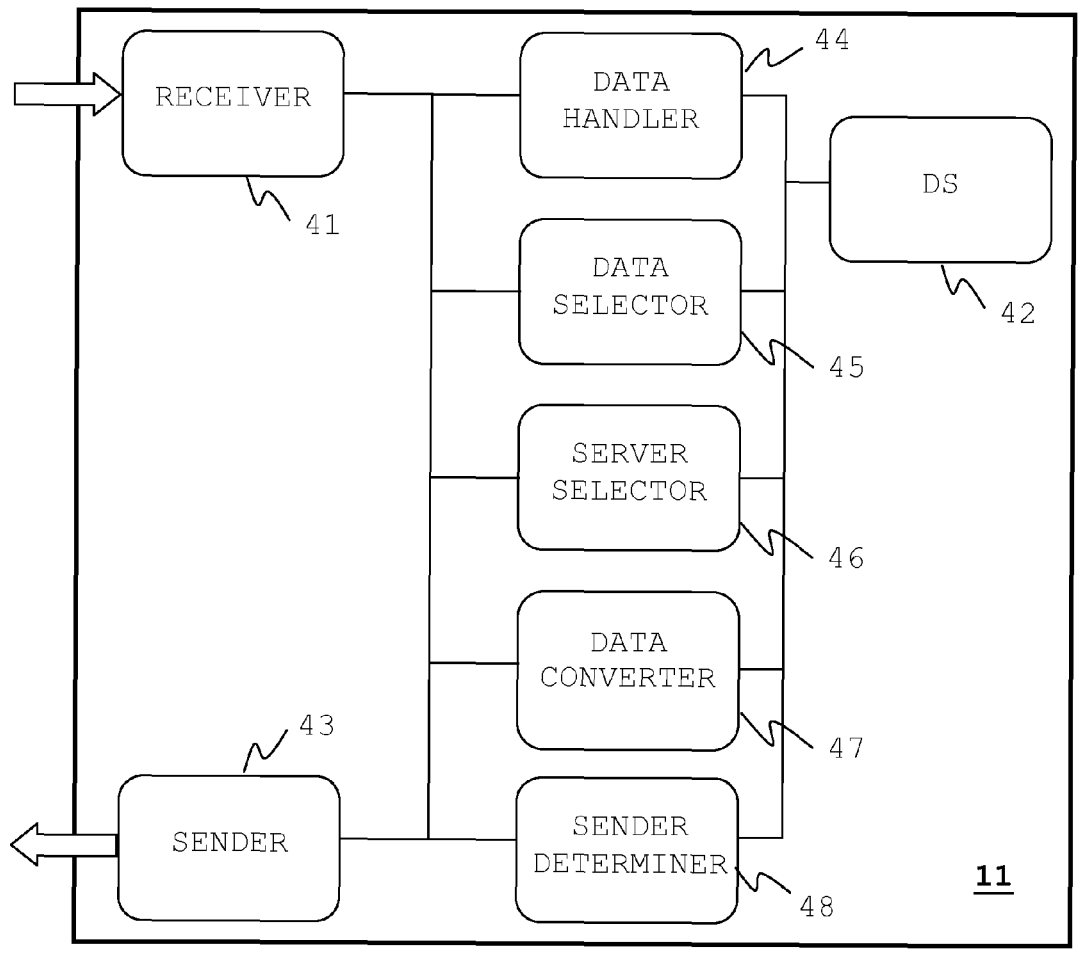
FIGS. 4 and 5 illustrate schematically the structure of, respectively, a database server and a service server according to one embodiment of the invention.
Figure 5:
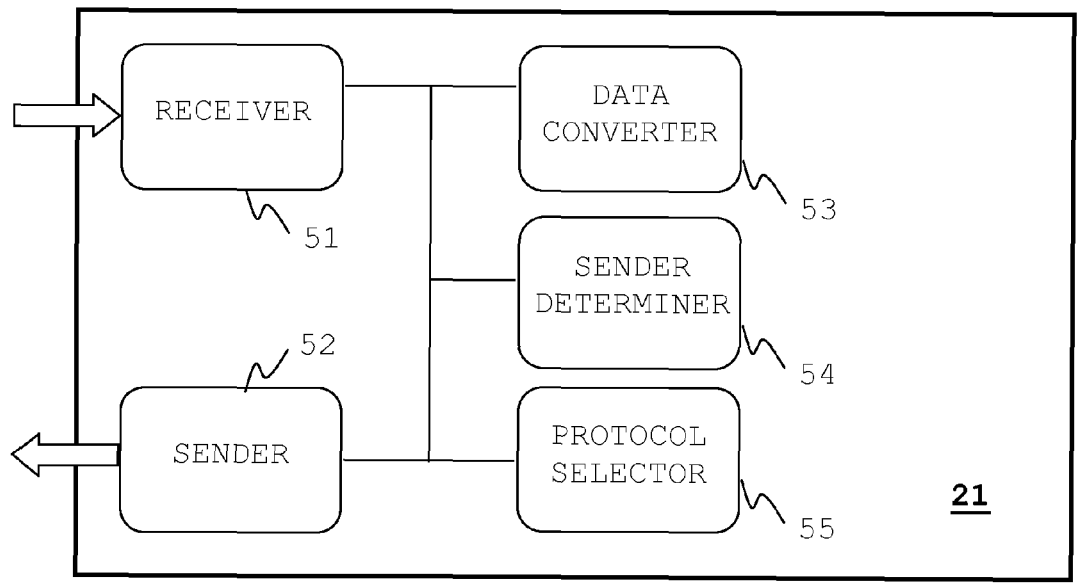

Further details and embodiments of the invention shall now be described with reference to FIGS. 3 to 5; wherein FIG. 3 illustrates steps of a method according to embodiments of the invention, and FIGS. 4 and 5 illustrate schematically some functional structural elements of, respectively, a database server DBS 11 and a service server (e.g. HSS 21) according to one embodiment of the invention. As will be apparent for the skilled person in view of the foregoing description, the functional elements described with reference to FIG. 4 or 5 can be accomplished by means of software and/or hardware specially adapted to perform the described functionality. For example, any of the servers referred herein (e.g. 11, 21) can be implemented in a computer based apparatus driven by computer programs comprising computer readable instructions that, when loaded and executed therein, makes such a kind of machine to behave according to a specific functionality and produce technical results (either or both: internal or external to it), as specified and governed by these instructions. The skilled person, in view of the present description, would face only routine work for devising computer program products that when loaded into one or more computer based apparatuses can make them to behave according to any of the embodiments described herein. As it is well known, a typical computer based apparatus comprises at least a processor with access to a memory storing instructions suitable to be executed by the processor.

Although embodiments of the invention with regard to method steps are illustrated by a single FIGURE (FIG. 3), it is to be noticed that these embodiments comprise different, but cooperating, methods performed, respectively, by a database server DBS (11) and by one or more service servers (21, 22, 31, 32). Although this will be apparent from the foregoing description, a short summary of some steps of these (cooperating) methods is described below.

A method in the database server DBS (11) comprises, among other steps detailed later:
  receiving a first message requesting a data operation to modify data related to a user,
  modifying a first data related to the user according to the received request, and
  sending a second message notifying the data modification to a first service server (21) comprising: an identifier of the user, information relating to the first data after the modifying step, and an identifier of a second service server (23) among said plurality that handle data related to the user so as to provide a service to said user.

A method in a service server (e.g. 21) comprises, among other steps detailed later:
  receiving from the database server (11) a first message notifying a data modification of a first data related to a user, the message comprising: an identifier of the user, information relating to the first data after the modifying step on the database server (11), and an identifier of a second service server of the system (e.g. 23, 24, 25, 33, 34 or 35) that handle data related to the user, and
  sending, upon reception of the first message, a second message to the second service server comprising an identifier of the user and requesting to modify a data held therein in relationship with said user.

Going back to FIG. 3, in step 1101 the DBS 11 receives a first message requesting to modify data related to a certain user. For the sake of illustration, the message can be assumed to come from provisioning server 12. The first message of step 1101 can be a result of a user requesting, e.g. from his terminal via HTTP or WAP a change on any of his profile data, such as activation, deactivation or modification of a given supplementary service, wherein such a request arrives to the provisioning server 12 in an automated manner (e.g. redirected or proxyed by a web portal), and wherein server 12 might behave as a provisioning gateway. The first message of step 1101 can also be a result of e.g. a human operator entering provisioning or data management information into the provisioning server 12.

The message received in step 1101 can comprise, for example: a request to add new data (e.g. LDAP "Add Operation"), a request to delete an existing data (e.g. LDAP "Delete Operation"), or a request to modify some data (e.g. LDAP "Modify Operation"). It is to be noticed herein that LDAP is used as an exemplary embodiment, and that the meaning of "modify" in this description is not limited to the specific meaning of "modify" as in LDAP terminology (i.e. as merely related to LDAP "Modify Operation"). Instead, the "modify" term used along this application, unless otherwise stated, relates to: changing adding or deleting some data, which, in the particular case of a LDAP adapted DBS, can refer to an entry (e.g. any of the elements shown in FIG. 2) storing data of a user, as well as to any of the attribute(s) stored within the affected entry(ies).

In order to receive external messages (as the one received in step 1101), the DBS 11 comprises a receiver unit 41 which is adapted to receive communications from other servers (e.g.: 12, 21, 22, 31, 32) using, for example, LDAP protocol over a Transmission Control Protocol over Internet Protocol, TCP/IP, communication infrastructure. The message received in step 1101 comprises the necessary data for the DBS 11 so as to identify the data to be modified and making possible for the DBS to accomplish with the required modification. For example, if LDAP is used, it comprises an identifier (e.g. LDAPDN) usable to determine in the DBS 11 the concerned user as well as the concerned data of said user which are requested to be modified (e.g. CS-SRV#M).

Subsequently, on step 1103 a data store handling unit 44 in the DBS 11 receives the necessary information from the receiver unit 41 and modifies in the data storage unit 42 a first data related to the concerned user according to the received request (step 1101). The data storage unit 42 of a database management server DBS 11 can comprise different storage devices, including disks and/or memory chips, either, located within the same physical machine, or distributed along separated database machines.

The process can then continue by sending from the DBS 11 a second message (M2), as a result of the steps 1101 and 1103, towards a first service server (e.g. any of: 21, 22, 31, 32) notifying the data modification and comprising: an identifier of the user affected by the first message received on step 1101, and information relating to the first data after the modifying step. The information relating to the first data after the modifying step preferably comprises type and updated content of the first data according to a format that can be understood by the receiving service server (21, 22, 31, 32) for facilitating its further processing. The sending of the second message is illustrated in FIG. 3 by step 1109.

For sending the second message (step 1109) the DBS 11 comprises a sending unit 43, which e.g. can share some hardware and/or software communication resources with the receiver unit 41, such as the TCP/IP protocol stack and/or physical connection lines, and which can operate over this communication infrastructure according to Simple Object Access Protocol, SOAP for the purpose of sending the second message (step 1109). Also, the sending unit 43 can be suited to operate also according to LDAP protocol; for example, to reply according to LDAP to the message received in step 1101.

Advantageously, the second message can also comprise some further data which was/were not necessarily modified by the processing of the first message (step 1103), but which can be stored by the DBS 11 in relationship to the modified data, such as an identifier of a second service server of the system that handle data related to the affected user (e.g. an identifier of: 23, 24, 25, 33, 34 or 35), as well as other data held by the DBS 11 which are stored in relationship with the affected user (i.e. the user whose data were modified on step 1103). For accomplishing with this latest feature, the DBS 11 preferably comprises a data selecting unit (45) that can be adapted to access the data storage 42 for selecting some further data related to the user (FIG. 2, SUBS) affected by the modification. Preferably, some kind of logical links, or similar mechanisms, are established between certain data of a user (SUBS) stored in the DBS 11 (links not shown in FIG. 2) which are usable by the data selecting unit 45 to select which further data related to the same user data that underwent a modification (step 1101) can be included within the second message 1109.

Introducing in the second message (1109) the identifier of the second service server of the system that handles data related to the user affected by the modification is a feature of the invention that helps to provide data consistency between data of users stored by the DBS 11 and temporary copies of some of these data that can be scattered along a plurality of service servers (e.g.: 23, 24, 25, 33, 34, 35), and, at the same time, helps to diminish the necessary signaling for performing such a synchronization by introducing some changes in the DBS 11, which is merely required to find and use some data it holds in relationship with the modified data (step 1101).

For example, when a user registers into the IMS domain 20, a HSS of this domain is supposed to hold an identifier of the S-CSCF assigned to serve such a registration. Similarly, when a user register into the CS domain of a GSM system (e.g. 30), a HLR of this domain is supposed to hold an identifier of the MSC/VLR assigned to serve such a registration. In a system arranged to DLA, such as system 100, the identifiers of these service servers (i.e. assigned S-CSCF, and assigned MSC/VLR) are stored by the corresponding servers (e.g. 21, 22, 31, 32) in the back end storage DBS 11 as data belonging to the corresponding "leaves" of the logic tree (as shown in FIG. 2). For example, the identifier of a serving MSC/VLR assigned to serve CS services for a CS registration of a certain user would belong to CS-DAT of said user (element not illustrated in FIG. 2), and the identifier of a serving S-CSCF assigned to serve IMS services for a IMS registration of a certain user would belong to IMS-DAT of said user (specific elements not illustrated in FIG. 2).

However, according to one embodiment of the invention, the process, as illustrated by FIG. 3, proceeds to step 1105 wherein it is first determined whether sending or not the second message (M2, step 1109), and then, on step 1107, it is determined the destination of said second message, if proceeds, and/or some additional contents on said message, according to some specific criteria which shall be later detailed. For these purposes, the DBS preferably comprises: a message sending determining unit (48) for determining whether to send the second message depending on the first data, or depending on if the sender of the first message and the first service server are the same or are of the same type. For example, the message sending determining unit 48 can check on step 1105 some flag associated to certain user data (SUBS) for determining whether a data modified (or subject to be modified) by a received request (1101) is/are subject to a subsequent notification (step 1109), thus saving unnecessary further signaling.

According to one embodiment of the invention, the DBS 11 further comprises a server selecting unit 46 adapted for selecting a service server (e.g. 21, 22, 31 or 32) where to send the message notification of step 1109 according to the data modified on step 1103. For example, any of the user data (SUBS) illustrated in FIG. 2 can be linked to (or comprise) certain identifiers of a related server (e.g. 21, 22, 31 or 32), which can be used by unit 46 for determining in the DBS 11 the receiver of the data modification notification sent on step 1109.

Depending on alternative implementation details, the server selecting unit 46 can work in cooperation with the data selecting unit 45, and even with the sender determining unit 48, using some additional information in the DBS 11 in relationship with the data stored therein, which facilitate their respective functions. For example, an additional table in the DBS can hold relationships between:

[a] Information about a certain data stored therein (e.g. in LDAP, this can refer to a certain object and/or to a certain attribute of an object);

[b] Information about the application(s) to which said data relates that can be used for selecting the service server destination of the message of step 1109; and

[c] Information about some further data, related to said data, which might be needed, either or both: for determining in the DBS whether to send the message (step 1109), and/or to determine further related data (D2) to be included in said message that might be needed for the further processing of the second message on the destination service server.

The table could then comprise a plurality of entries "a", "b" and "c" for each or some of the data held by the DBS. An advantage of storing entries "a", "b" and "c" only for some of the data stored in the DBS is that the mere presence/absence of an entry "a" for a certain data can be used to determine (e.g. by the sender determining unit 48) on step 1105 whether a modification on said certain data has to be notified in a subsequent message on step 1109 or not and, thus, helps on reducing signaling in a simplified manner.

Taking as example the system scenario 100 illustrated in FIG. 1, an entry could comprise:

Under "a" information of a certain data that can be stored in the DBS in relationship with a user (e.g. an identifier of said type of data), such as information about a certain supplementary service;

Under "b" information on whether the data is related to HLR service application or to HSS server application, and even identifier(s) usable to route a message (e.g. the message of step 1109) to the corresponding service server (e.g. service server 21 or 22 in case of HSS application or service server 31 or 32 in case of HLR application). In particular, information under "b" can be used by the server selecting unit 46 for determining the first service server (21, 22, 31, or 32) destination of the message of step 1109; and Under "c" information about the registration status condition that must have a user whose data is/are affected by the modification of step 1103, and/or information on some additional data (e.g. identifiers of said type of data) related to said user, and stored in the DBS in relationship with the user, that need to be sent in case the data under "a" is modified. Therefore, data referenced under the "c" entry related to a certain "a" entry can be used on the further-data (D2) selection of step 1107, as well as for determining condition(s) for sending or not the notification message of step 1109.

For example, in the scenario illustrated in FIG. 1, the "registration status" established on "c" (e.g. whether "registered" or "not registered"), in relationship with a certain data as established by "a", provides the advantage of diminishing signaling in a simple manner, because the sending, or not, of the notification message of step 1109 can be made dependent on e.g. the registration status of the user. For example, modification of the call forwarding activation status for circuit-switched CS voice calls of a user is preferably only notified to the corresponding service server (i.e. HLR) if the registration status of said user in the CS network domain 30 (a data stored also in the DBS) is "registered". Therefore the table can comprise an entry wherein "a" identifies a data type such as call forwarding activation status for CS voice calls, wherein the corresponding "b" data store information for addressing a HLR (31, 32), and wherein "c" states that the registration status of the concerned used must be "registered". Also, there can be an entry wherein "a" identifies globally an object type on the DBS adapted to store all supplementary service information related to e.g. network domain 30, and wherein the notification (step 1109) of total or partial modification (step 1103) for a user is therefore conditioned by the information under the "c" related to said "a".

Going back to the method illustrated in FIG. 3, step 1107 can also comprise the selection of some further data (D2) which were not affected by the modifications requested on step 1101. In this respect, the data selecting unit 45 is adapted to select further data stored in relationship with the user affected by the modification (step 1103), which were not affected by said modification. This, as referred above can be achieved in a simplified manner by making the data selecting unit 45 to check the corresponding entry/ies on the aforementioned table of elements "a", "b" and "c" (in particular the type of the modified data "a" versus further data D2 that can be established on "c").

Alternatively, the information about the type of modified data "a" can be logically linked in other way (e.g. a reference to a further table) so that on step 1107 e.g. the data selecting unit 45 check which further data that may be stored in relationship with the modified data type ("a") of a user are to be sent in the data modification notification sent on step 1109.

As mentioned before, the message sent on step 1109 towards a certain selected first service server preferably comprises:

[1] one or more identifiers stored in relationship with the user whose data underwent the modification of step 1103;

[2] information relating to the data that underwent the modification of step 1103; and Examples of type of identifiers (element "1" above) that can be stored by the DBS in relationship with a user in a system as illustrated in FIG. 1 are: MSISDN, IMSI, SIP-URI, etc. Element "2" preferably comprises type information and content (as modified on step 1103) of the concerned modified data element(s).

Preferably, and as also mentioned earlier, the message sent on step 1109 towards a certain selected first service server further comprises, at least one of:

[3] Information relating to the first data before undergoing the modifying step 1103 (as above, it can comprise type and attribute content, although information about type can be redundant if it was not subject of the modification);

[4] Information about to the type of data operation received in the request of step 1101, which caused the data modification in step 1103 (for example, the type of LDAP operation requested); and

[5] Information relating to further (second) data (D2), which is/are stored in the DBS in relationship with the user whose (first) data were modified on step 1103, and which was/were not affected by said modifying step.

The information under element "5" preferably comprises an identifier of a second service server, which can be usable by the first service server (i.e. the receiver of the message sent on step 1109) for further communicating with it. As cited earlier, preferably, the second service server is a server that currently handles data of said user for providing a service to said user. Using the example illustrated in FIG. 1, a second service server can be e.g. a MSC/VLR 34 (for serving voice services on a mobile network CS domain) or a S-CSCF 24 (for serving multimedia services in a IMS domain). For example, when a user registers into a telecommunications system (100) from a terminal, a HLR or a HSS stores (in the DBS in case of DLA architecture) information about the corresponding (second) service server providing communication control services to this user, which is also provided (by the HLR or HSS) with a copy of the necessary data of said user (master stored in the DBS). The table below list an example of a configuration table held on the DBS 11 comprising information about second service servers (noted as location information), which can be used for determining the information to be sent in this respect in the modification notification message (1109).

| Application | Network interface | Location information | Location component |
|---|---|---|---|
| HLR | C | CS location, VLR | Destination address, Area Roaming flag, CAMEL support flag, GPRS support flag, Services support flag (ECT, LCS, etc.) |
| HLR | D | PS location, SGSN | Destination address, CAMEL support flag, GPRS support flag, Services support flag (ECT, LCS, etc.) |
| HSS | Cx | IMS Core Network location, S-CSCF | Destination address |
| HSS | Wx | WLAN location, 3GPP AAA Server | Destination address |
| HSS | Sh | IMS Application Server location | Destination address |

The information under element "5", usable to determine further content to be sent on the notification message of step 1109, can also comprise references some other further data (D2) which was/were not affected by the modifying step 1103, and that (as mentioned above with reference to the "second service server") can be sent on the message of step 1109, which can advantageously be used by the receiver of the message (first service server, e.g. HLR 31) for properly processing the data modification without making further queries to the DBS 11 for obtaining additional information that, according to the specific application logic the first service serves attend (e.g. HLR application services) might be needed. For example, if data stored in the DBS related to a user has/have been modified with regard to e.g. call/session forwarding information, barring of incoming calls/sessions, etc; in addition to an identifier of the (second) server currently assigned for serving communication services for said user (e.g. any of: 23, 24, 25, 33, 34, 35), it might be useful for the first service server receiving the message of step 1109 (e.g. any of: 21, 22, 31, 32) to receive further data that might be needed to process the modification and/or to further send towards the second service server. Examples of said further data (D2) can be: a certain identifier of the user in the same or different network domain (20, 30), common information regarding service barring, further identifiers related to said user (such as "Wildcarded Public User or Service Identifiers"), "Customized Application for Mobile Enhanced Logic"—CAMEL—information, information about a further second service server on a network domain different to the one related to the data that were modified (e.g. if modified data belong to domain 30, an identifier of a CSCF on domain 20, or vice versa), specific location information about an access network utilized by the concerned user for a registered terminal (e.g. a Wireless Local Area Network—WLAN—identifier, or other kind of access network identifier), etc.

This is achieved, according to embodiments of the invention, without increasing the complexity of the DBS and using some basic data linking features available in most of the database systems, since, as mentioned earlier, simple links pre-stored therein between some data, set up according to any suitable data link/map solution, solve the problem of determining which further second related data is/are to be included in a message notifying a modification on a certain first data in a simple manner; which does not require the DBS to be—say—aware of the specific meaning of the data according to the application service they relate. Moreover, impacts due to modifications in the logic of the service servers, as well as addition of new applications served by these servers, are minimized on the back-end storage system (DBS 11), since these modifications and/or additions does not require—say—exporting specific service logic to the DBS, but merely changing and/or establishing logical links between data held therein, and/or simply modifying these data.

Although not explicitly mentioned before, the DBS 11 (e.g. by way of further adapting the sender determining unit 48, or the sender unit 43) can be adapted to distribute a modification notification message (e.g. step 1109, and also step 1115 that shall be later described) among equivalent receivers. For example, the DBS can be suited to implement any suitable load distribution mechanism (e.g. based on: round-robin logic, weighted distribution logic and/or destination availability logic) for distributing the messages to equivalent first service servers. Therefore, a message to be sent on step 1109 (or 1115), if relating to a HSS application can, according to the distribution logic, be delivered to the available HSSs (e.g. 21 or 22, according to FIG. 1). For example, the server selecting unit 46 can check a table having an entry for each application (e.g. HLR and HSS applications), wherein each application entry is assigned a distribution group that consist of a list of identifiers, such as URLs or IP addresses, and additional information which is need to configure the selection to the corresponding destinations, which can comprise e.g. priority selection information in case there are more than one corresponding equivalent service servers (e.g.: 21, 22, 31, 32).

Next, as an exemplary embodiment of the invention, it is described some details for communicating data modifications between the DBS 11 and a first service server (e.g. any of 21, 22, 31, 32). The proposed protocol is referred herein as "network notification indication protocol" NNI, and can be based e.g. on SOAP using Extended Markup Language (XML) definitions for the message content.

The proposed protocol can comprise 2 messages: a request from the Network Notification client (i.e. DBS 11) to the server direction (i.e. a first service server such as server 21), such as illustrated in steps 1109 or 1115; and an acknowledge message in the server to client direction (not illustrated in the figures). They are referred herein, respectively, as Network Notification Indication Request (NNIR) and Acknowledge (NNIA) messages.

A possible format of a Network Notification Indication Request (NNIR) message is described below in a pseudo-formal language (e.g. compliant with XML), according to an embodiment that considers only some particular additional data (D2):

```
NNIR sequence{
    NNIRComponent ( ) sequence{
        ApplicationInformation (application) { }
        LocationInformation ( ) sequence{
            Location (typeOfLocation,
destinationAddress) sequence{
                ServiceFlags (typeOfFlag, flags) { }
            }
        }
        UserInformation ( ) sequence{
            UserIdentifier(typeOfIdentifier, identifier) { }
        }
        ModificationInformation (object, operation)
sequence{
            AffectedAttribute (name, modification) {
                oldvalue
                newvalue
            }
        }
    }
}
```

A detailed description of the elements above follows:

NNIR—As shown, it is a structure representing the user related information (i.e. about the user whose some of his data underwent a modification) that needs to be further processed and/or updated by service servers of the network. It is compounded by a sequence of NNIComponent element.

Each NNIComponent is (as illustrated), in turn, compounded by a sequence of: ApplicationInformation element, LocationInformation element, UserInformation element, and ModificationInformation element. These elements are described below.

Application Information element—Structure representing the application owner of the data whose modification triggered the notification message. In a scenario as shown in FIG. 2, possible values of application attribute are HLR and HSS (e.g. usable in case the same first service server—i.e. the receiver of this message—serves both kind of applications), and/or an identifier of a particular first service server (i.e. the destination of the NNIR message—steps 1109/1115—itself).

LocationInformation element—Structure representing serving location information relating to the subscriber whose modification triggered the notification event (i.e. NNRI message, step 1109). It comprises of a sequence of location element, which in turn comprises two attributes and a sequence of optional ServiceFlag element. In the two following tables the compounded attributes and sub-elements of the element "LocationInformation" are described.

| Location attributes | Type | Description |
|---|---|---|
| typeOfLocation | Enumerated | CS, PS, IMS, etc. |
| destinationAddress | OctectString | It comprises the address of the corresponding second service server; e.g. an address of a MSC/VLR, SGSN, CSCF, AS, 3GPP AAA Server, etc. |

| ServiceFlag attributes | Type | Description |
|---|---|---|
| typeOfFlag | Enumerated | It can take the values GPRSSupport, CAMELSupport, AreaRoamingSupport, ECTSupport, LCSSupport, etc. |
| flags | octectString | It contains the flag(s) value information |

Userinformation element—Structure representing user identifier(s), according to the affected application, whose modification triggered the notification event (i.e. NNRI message, step 1109). It comprises a sequence of UserIdentifier element. In the table below the compounded attributes are described.

| UserIdentifier attributes | Type | Description |
|---|---|---|
| typeOfIdentifier | Enumerated | It can take the values of, e.g.: MSISDN, IMSI, Public User Identifiers taking the form of SIP-URI, NAI, etc. |
| identifier | octectString | It stores the user identifier(s) |

ModificationInformation element—It is a structure representing the data object whose modification triggered the notification event (i.e. NNRI message, step 1109). It comprises according to this example: two attributes, and a sequence of optional "AffectedAttribute" element (later described). Some attributes of the element "ModificationInformation" are illustrated in the table below.

| ModificationInformation attributes | Type | Description |
|---|---|---|
| object | String | It comprises an identifier of the modified data object; e.g.: the corresponding LDAPDN if LDAP protocol is used. |
| operation | Enumerated | It identifies the operation that caused the data modification. It can take e.g. the values of: add, modify, or delete |

The AffectedAttribute element can, in turn, comprise an structure identifying the attributes (e.g. as identified by the LDAP operation of step 1101) whose modification triggered the NNIR notification of step 1109. It is compounded by two attributes and two further elements, which can be optional. The following tables represents the attributes cited above with regard to the element "AffectedAttribute".

| AffectedAttribute attributes | Type | Description |
|---|---|---|
| name | String | It comprises an identifier of the modified data attribute |
| modification | Enumerated | It identifies the type of modification made on the attribute. It can take e.g. the values of: add, modify, or delete. |

| AffectedAttribute elements | Type | Description |
|---|---|---|
| oldValue | String | It comprises the data attribute value before the modification took place. It applies when e.g. a LDAP modify or a LDAP delete operation is performed. |
| newValue | String | It comprises the attribute value after the modification took place. |

A possible format for the "Network Notification Indication Acknowledge" (NNIA) message, as sent from the first service server to the DBS 11 as a reply to a NNIR message sent on step 1109 (or 1115), is described schematically below:

```
NNIA {
        ResultCode
        Diagnostic
}
```

NNIA—As shown, it is a structure representing the result of the Network Notification Indication Request message as sent as a reply from the service server receiving the data notification message (NNIR message, step 1109). It comprises two elements ResultCode and Diagnostic, as disclosed in the table below.

| NNIA elements | Type | Required | Description |
|---|---|---|---|
| ResultCode | String | Mandatory | It contains the successful or unsuccessful result of the NNIR execution. This information can be further used by the DBS 11 e.g. in case of failure. |
| Diagnostic | String | Optional | It is an optional information element comprising information relating to the result of the data modification notification (NNIR), which can be further used by the DBS 11 to, e.g., undo some actions in case of failure, and/or be used by the network operator for further purposes |

The detailed description of a method according to some embodiments of the invention shall now continue with reference to the processing on the first service server (e.g. any of: 21, 22, 31 or 32) of the message sent by the DBS on step 1109 and received therein. Said processing is illustrated in FIG. 3 by steps 2101 to 2105.

In order to receive external messages, a first service server (such as server 21 illustrated in FIG. 5) comprises a receiver unit 51 which is adapted to receive communications from other servers, such as DBS 11. In particular, for receiving the communications from the DBS 11 on step 1109 (or step 1115) (referred also herein as "second message" M2), the receiver unit 51 can be adapted to receive messages according to, among other, via SOAP protocol over a TCP/IP communication infrastructure, which requires the necessary (well-known) protocol stack(s) to be implemented therein.

Also, in order to send, upon reception of a communication from the DBS notifying a data modification (second message, 1109), a further message (referred also herein as "third message" M3, step 2105 later explained), server 21 further comprises a sending unit 52, which e.g. can share some hardware and/or software communication resources with the receiver unit 51, such as some protocol stacks and/or physical connection lines. In particular, in addition to the protocols required to communicate with further (second) service servers (e.g. 23, 24, 25), such as DIAMETER (or MAP if—first—service server 21 were a HLR), the sender unit 52 can be suited also to communicate via SOAP, for example, with the DBS if confirmation messages (as NNIA referred earlier) are implemented, and also via LDAP so as to modify (e.g. update, delete, set) data on the DBS due to its normal operation when executing its own application service logic.

The service server 21 can also comprise a sending determining unit (54) for determining whether or not to send a further message (referred also herein as "third message", step 2105 later explained), and a protocol selector for selecting the appropriate communication protocol for said further message. For accomplishing with their respective functions, the sending determining unit 54, as well as the protocol selecting unit, can e.g. use local linked data (e.g. tables), as referred earlier with reference to embodiments of the DBS 11 (FIG. 4), and, based on them, work in co-operation. As an illustrative example, service server 21 can have a table listing entries comprising:

Identified type of data that can be notified from the DBS;
Type of operation that can be notified from the DBS said data;
Information (e.g. on a per data type and/or operation) on whether a further message is to be sent (e.g. yes/no) upon a modification notification received from the DBS. This may include taking also into consideration, in addition to the type of modified data, further data received in the notification from the DBS; and
Information (e.g. on a per data type and/or operation) on the type of protocol to be used for sending said further message (e.g. MAP towards servers such as 33, 34, 35; or DIAMETER towards servers 23, 24, 25).

For example, if the modification notification message (step 1109) indicates that object data related to a certain subscriber has been new created (e.g. a new subscriber entry—SUBS—, with the necessary data attributes for a new user, has been created in the DBS upon receiving e.g. a LDAP "Add Operation"), then typically should not be necessary send any further message from server 21 to any other service server (e.g. a MSC/VLR, SGSN, CSCF, etc) since, likely the user is not yet registered through nor served by any other service server. On the other hand, if e.g. the modification notification message refers to a certain data attribute(s) related to a certain supplementary service (e.g. IMS-SRV#2), and the user is currently registered, then a subsequent further message from server 21 to any other service server (as indicated by the notification modification message) shall be sent. Nevertheless, the "Information on whether a further message is to be sent" (y/n) referred above, might be unnecessary if the DBS is already configured with information on what data modifications are, or not, considered for sending the message of step 1109.

As illustrated in FIG. 3, the method continues in any of servers: 21, 22, 31 or 32 (as it corresponds) by selecting on step 2101*a* protocol for sending a further message (M3) towards the corresponding second service server (e.g. any of: 23, 24, 25, 33, 34 or 35), and by determining on step 2103 whether to send or not such a message. It is to be noticed that steps 2101 and 2103 can be executed in the reverse order as the one shown in the figure. Next, on step 2105 the further message M3 is sent, if proceeds. The message M3 sent on step 2105 comprises a request to modify at least equivalent data—as they were notified as modified on step 2101—stored on a further service server (e.g. any of: 23, 24, 25, 33, 34 or 35).

If a further message (M3) is to be sent on step 2105, the service server (e.g. 21, 22, 31, 32) can incorporate a data converting unit (53) for adapting the format of the data to be sent in the message M3 to the appropriate format according to the corresponding protocol. For example, the modified content of e.g. a call forwarding status as notified from the DBS might need to be adapted to the format specified by e.g. MAP protocol for the operation "Insert-Subscriber-Data" to be sent (as M3) towards a MSC/VLR. Similarly, some data on a received modification notification message (M2) might need to be adapted to contents (i.e. to the so called "attribute-value-peer" AVP) suitable to DIAMETER "Push-Profile-Request" PPR format if transmitted (M3) via DIAMETER protocol towards an Application Server 25.

As will be referred later, the data converting unit 53 can also be adapted to perform other functions, such as converting the type format and content of a given data which has been notified as modified (i.e. processing in server 21 of the data modification notification message sent on step 1109), and which belongs to a first network domain (e.g. 20), to the type format and content suitable for being used in a second network domain (e.g. 30). In this case, the data sender unit 52 can also be adapted to receive a data conversion outcome from the data converting unit 53 (e.g. as a result of receiving the data modification notification message of step 1109), so as to send a further message to the DBS 11 requesting a data operation to modify data with regard to a certain user (i.e. the same as affected by steps 1101 and 1103) and comprising the converted data (step not shown in FIG. 3). Subsequently, the DBS 11 can perform a subsequent step 1103 for the concerned user. Preferably, in this case the request sent by the second service server (e.g. 21) comprises a kind of flag to indicate the DBS that steps subsequent to 1103 does not need to be executed by the DBS.

The method, according to additional embodiments of the invention also illustrated in FIG. 3, can proceed further to provide additional advantageous features which can contribute also to reduce signaling and, thus, improve the performance of systems comprising a centralized database storage system DBS and, specially, reduce signaling and leveraging inherent benefits of systems arranged according to a Data Layered Architecture DLA.

The method steps illustrated by FIG. 3 from step 1111 to step 3105 comprises, wherein a DBS stores data of users relating to a first and a second network domain (20, 30): converting (step 1111) a modified first data (e.g. modified on step 1103) related to a user on the first domain to a format according to the second domain (D1, D1C), storing in the DBS the converted modified first data (D1C) in relationship with other data of said user (step not explicitly illustrated in FIG. 3), and sending (step 1115) a further data modification notification message (M2C) to the corresponding second service server.

Various advantages are provided in virtue of this feature. For example one single back-end storage system DBS is needed, wherein data relating to different domains (i.e. most likely having different types regarding format and contents) can advantageously be stored logically separated, but wherein some of them can be synchronized (by type and format of data content conversion) upon modification. Moreover, user interaction with servers of a system 100 to e.g. set, delete or change certain data related to a certain service, such as: incoming service forwarding (e.g. for incoming data or voice calls, or for incoming IMS multimedia sessions), or incoming service temporary barring; can be simplified and require less signaling. Similar advantages can be obtained when coming to provisioning. For example, when a provisioning server 12 modifies (e.g. upon end user request, or upon network operator policies) certain data related to a user; for example, affecting the incoming service forwarding or barring services cited above. The steps illustrated by FIG. 3 consider a particular realization (steps 1111 to 1115) wherein the conversion functions are performed by the DBS 11, and then these data modifications (due to conversion) notified in a message (M2C) to the corresponding first service server (step 1115) for its further processing therein. This is illustrated by steps 3101 to 3105, which are functionally equivalent to previously described step 2101 to 2105 with regard to message M2. However, it can be also envisaged a conversion being performed in a further server. For example, the conversion is performed by e.g. server 21 as one more process (not shown in FIG. 3) related to the reception of the data modification notification message M2; which then should be followed by a subsequent request to modify data towards the DBS 11 (steps equally not shown in FIG. 3). For this purpose, a service server such as server 21 can comprise a data converting unit 53 also adapted to, for example, change format/content of a certain data related to IMS domain (20) to format/content of a equivalent data on the CS or PS domains (30), or vice-versa.

On step 1111, the DBS 11 executes the process of converting a data modified on step 1103 (D1), which belongs to a first network domain, to a format according to the second domain (D1C), and stores the converted result in relationship with the corresponding data entry/ies attributes of the same concerned user's (SUBS). For example, using FIG. 2 for illustration purposes, if data under "CS-SRV#M" has been modified on step 1103, step 1111 can further comprise, apart of modifying the data format/content, store the modification resulting data on e.g. "IMS-SRV#N", which are considered equivalent. This equivalence does not require—say—implementing in the DBS 11 service logic of certain data on a given network domains, thus, increasing its complexity. Instead, establishing simple logical links (as illustrated by 201) can suffice for the purposes of: determining whether a data conversion is needed, where in the data structure (SUBS) is its correspondent, and how the content of a certain data is to be converted from a first format (e.g. suitable to be used by service servers on a first network domain) to a second format (e.g. suitable to be used by service servers on a first network domain). Techniques related to details for linking data, e.g. with the purpose of a further processing as described herein, are well know by the skilled person; for example: making that two or more data elements point to a single spot (e.g. data record/s) on the memory storage (e.g. 42), using aliases wherein a given alias is assigned to refer to different (linked) data (e.g. to CS-SRV#M and to IMS-SRV#N), data pointers, etc.

For accomplishing with the procedures described above in relationship with step 1111, the DBS 11 can comprise a data converting unit (47) for converting the modified first data to a format according to the second domain. Also, the data converting unit 47 can cooperate with the data storage handling unit 44 for storing in the data storage 42 the converted modified data of a certain user (SUBS) for a first network domain (20) in relationship with data of the same user in a second domain (30).

The data conversion that can be accomplished for a data from a first domain (i.e. as modified on step 1103) to a second domain, independently on whether it is performed by a conversion unit on the DBS 11 (unit 47), by a first service server (e.g. any of: 21, 22, 31, 32) (unit 53), or by another kind of server specialized in data conversion features (not shown in FIG. 1). The conversion step 1111 preferably comprises applying some kind of data content synchronization rules, which can be pre-established for converting the format (e.g. data type and content) of, for example, certain data related to IMS according to the format of functionally equivalent data on the CS or PS domain of a 2nd. generation mobile network (e.g. GSM/GPRS), and vice-versa. Examples of functionally equivalent data are e.g. those controlling barring of incoming sessions (e.g. voice calls in a CS domain, data calls in a PS domain, SIP sessions in IMS domain), or controlling the forwarding of incoming sessions, by diverting them towards another end destination different from the one originally requested.

For example, the conversion rules can establish a correspondence for a data described for any user's data defined under SUBS (FIG. 2) between: a certain data value on data belonging to the CS domain (e.g. CS-SRV#M), which e.g. is used by a service server for determining whether incoming voice calls for a certain user in a CS domain (30) will be diverted towards a certain alternative destination (e.g. towards another MSISDN), and a corresponding (201) data value(s) to be modified on the content of e.g. IFC(s) related to the same user (e.g. IMS-SRV#M, in part or in full), so that his related service data on the IMS domain, in case of activation, modification or deactivation of forwarding features in the CS domain are further modified accordingly in the IMS domain; and vice-versa. Modifying data related to "Initial Filter Criteria" IFC is cited herein just as an exemplary embodiment, these and/or other data stored for a user (SUBS) in relationship with a IMS domain (IMS-DAT), which could be directly interpreted and executed by a S-CSCF, can also be used. The structure and content of the IFCs is disclosed e.g. by the aforementioned 3GPP Specification 29.228 V8.5.0 on Annexes B or E.

Following the use cases cited above as examples, there can be a conversion rule held by a data converting unit (e.g. 47 or 53) that, upon a modification of e.g. voice call forwarding information for a user on the CS domain 30 (e.g. CS-SRV#M content) stating by means of a certain value (e.g. stored by CS-SRV#M content) that all incoming voice calls shall be delivered towards a certain alternative destination (e.g. the MSISDN of another user, as included e.g. also by CS-SRV#M content), establishes how content of data of the same user related to the IMS domain (e.g. IMS-SRV#N) is to be modified, so that incoming sessions on the IMS addressing to this user shall also be delivered to the same alternative destination. In this case, if e.g. CS-SRV#M data are modified on step 1103 so that their current content is, for example, {2, +34913391000}, wherein "2" would represent voice "unconditional call forwarding", and "34913391000" would represent a MSISDN number where to forward (divert) the incoming voice calls; then, for example, the content one or more "Initial Filter Criteria" IFC of the concerned user (e.g. as stored by IMS-SRV#N) should be adapted according to a modification rule that would establish how the content of e.g. "TriggerPoint" and/or under "ApplicationServer" (e.g. as content of a IFC stored by IMS-SRV#N) should be modified, so that further incoming IMS sessions received on the IMS domain 20 for the same user (SUBS) are also to be unconditionally diverted towards the MSISDN "34913391000", e.g. by using a Tel-URL containing said digits.

A further example case can be provided with reference to incoming session barring features. For example, it can be assumed that CS-SRV#M represents data entries comprising incoming voice call blocking/barring information, wherein a value "1" on a register instantiating said data for a certain user means that e.g. all incoming voice calls are to be barred. Then, a conversion rule can be stored in relationship with the type of data CS-SRV#M represents, so that a modification on said data for a certain user on CS-SRV#M to a value "1" triggers a conversion process (e.g. step 1111) affecting, for example, contents of "TriggerPoint" and/or "ApplicationServer" stored on a IFC related to the same user (e.g. as represented by IMS-SRV#N in FIG. 2). The result of said conversion would accordingly then cause (e.g. when subsequently notified to a CSCF such as service server 23, as in step 3105) that further incoming SIP sessions for said user handled by the IMS domain 20 are also barred.

The skilled person, in view of the teachings herein, will be faced only to routine work tasks for selecting, among prior-art techniques, mechanisms for linking data and defining data format conversion mechanisms for data contents between data related to a first domain (e.g. 20) and data related to a second domain (e.g. 30) which might relate to a similar functionality, such as: barring of incoming sessions, forwarding of incoming sessions, etc.

Subsequent steps 1113 and 1115 can be performed according to the details/options given before with regard to, respectively, steps 1107 and 1109, with the particularities of: that the destination (first) service server of the message M2C is selected according to the domain relating to the modified data (e.g. if HSS was selected on step 1107, then a HLR is to be accordingly selected on step 1113), that the additional data that can be sent on the message M2C are, preferably, also subject to conversion (e.g. D2C represent D2 of step 1107, properly converted), and that, in particular, the information about the further service server which handle data of the concerned user in the network domain related to the converted data (e.g. MSC/VLR, SGSSN, CSCF) is also selected by the DBS 11 (e.g. using the aforementioned tables) according to the converted modified data (D1C).

At reception of the message M2C notifying the modification on the converted data D1C (which was/were previously modified and stored on step 1103) and D2C (if proceeds), steps 3101 to 3105 are processed by the receiving service server (e.g. any of: 21, 22, 31, 32) as described earlier with regard to steps 2101 to 2105. In particular, the receiving service server (e.g. any of: 21, 22, 31, 32) needs not be aware—and its processing thus being transparent—on whether it is receiving a message coming from an original data modification (i.e. result of step 1103) or coming from a subsequent data modification performed by the DBS (i.e. result of step 1111).

As a result of the process above, data relating to the same user (SUBS) that are usable for providing services to said user on a first network domain (e.g. 20) and in a second network domain (e.g. 30) can be kept consistent in an automated manner; which can result in a better user perception, and a easier and more reliable handling of user data for a network operator. Further, the inherent advantages provided by a system adapted to a Data Layered Architecture DLA (as in FIG. 1) can be kept, whilst minimizing signaling to/from the back-end storage system (DBS 11), and also minimizing the design adaptation impact on existing database system products.

FIG. 6 illustrates a simplified signaling flow between some servers of FIG. 1 according to one embodiment of the invention, which considers the data format conversion over the modified data takes place within the DBS 11.

Flow 601 represents a message requesting the DBS a data operation to modify data related to a certain user, which is processed as described earlier with reference to steps 1101 to 1107. The reception of the message of flow 601, as also disclosed earlier, can cause the DBS to send on step 1109 a message notifying the data modification to a first service server. This is illustrated in FIG. 6 by flow 602, which considers, as an example case, that the data modified as a result of the request received in flow 601 was/were data related to HSS application (e.g. IMS-SRV#N), and that a HSS service server (e.g. 21) is selected as the destination of the message illustrated in flow 602.

The service server receiving the data modification notification message of flow 602 (e.g. HSS 21) then processes it as described before with reference to steps 2101 to 2105, which can involve sending on flow 603 a further message towards a further (second) service server (S-CSCF)—information about which is preferably indicated by the DBS in the message of flow 602—, comprising an identifier of the user and requesting to modify a data held therein in relationship with said user. The message of flow 603 preferably comprises type/content values for the data to be modified by the destination (second) service server (S-CSCF) on its own stored data, which format can be adapted, if needed, e.g. by the sender of the message of flow 603. As cited earlier, a message such as the one illustrated by flow 603 comprises a data modification request related to data which was/were modified e.g. upon reception of the data modification request message of flow 601, and which are also stored by a further service server (e.g. S-CSCF).

For example, if the data modification requested by the message of flow 601 implies, for a certain user, forwarding unconditionally all incoming multimedia sessions in the IMS domain (20), or barring all incoming multimedia sessions in the IMS domain, then the outcome of the process is that the S-CSCF assigned to serve said user (e.g. for a given terminal of the user registered in the IMS domain) will, as a result of receiving and processing the request of flow 603, gets its locally held data updated accordingly with regard to these services. According to this example, the message of flow 603 can be a DIAMETER message "Push-Profile-Request" PPR.

Subsequently, the DBS, according to an embodiment detailed before (steps 1111 to 1115), can perform (step 1111) a data conversion on the data (D1) that were modified on the DBS as a result of the message of flow 601, and a subsequent storage of the modified data (D1C) on the DBS storage in relationship with the same user affected by the first modification (step 1103). The DBS can also convert on step 1111 some further data (D2) related to the same user. Then, the DBS sends (step 1115) a message notifying the data modification relating to the converted modified data to another service server (HLR), as illustrated by flow 604.

The reception of the message of flow 604 by a service server such as a HLR (as illustrated) implies a similar processing as described before with reference to HSS/S-CSCF and flows 602-603 and, more generally, as described earlier with reference to steps 3101 to 3105 (or equivalent steps 2101 to 2105) of FIG. 3. Therefore a subsequent message (flow 605) will be sent from the HLR requesting to modify data of a user held in a further service server (e.g. MSC/VLR 34), as per the converted modified data (D1C), which shall be processed therein accordingly. The message of flow 605 can be e.g. a MAP message "Insert-Subscriber-Data". Following the example above, if the data modification requested by the message of flow 601 implied, for a certain user, forwarding unconditionally all incoming multimedia sessions in the IMS domain (20), or barring all incoming multimedia sessions in the IMS domain; then the data modification request message of flow 605 could convey, for the MSC/VLR serving voice calls in a CS domain (30) for the affected user, an identifier of said user in said MSC/VLR, and the necessary data to be modified in the MSC/VLR with regard to said user so that all of his incoming voice calls are e.g. diverted or barred.

The invention has been described with respect to some exemplary embodiments in an illustrative and non-restrictive manner. Variations can be readily apparent to those of ordinary skill in the art. For this reason, the invention is to be interpreted and limited in view of the claims.

The invention claimed is:

1. A method for handling data related to users of a communications system, the communications system comprising a database server and a plurality of service servers, the database server for storing data related to a plurality of users of the system, the plurality of service servers for providing services to the users, wherein a first set of the service servers access to the database server for obtaining and/or modifying data stored therein so as to provide the services they respectively serve, wherein a second set of the service servers handle data related to users provided by a server of the first set on a temporary basis so as to provide control of communication services for the users, the method comprising:
   receiving, by the database server, a first message requesting a data operation to modify data related to a user;
   modifying, in the database server, a first data according to the first message, the first data corresponding to the user and suitable for use in a first domain of the communications system;
   sending, from the database server to a first service server of the first set, a second message notifying the first service server about the data modification, the second message comprising:
      an identifier of the user;
      information relating to the first data after the modifying;
      an identifier of a second service server of the second set that handles further data corresponding to the user, the further data:
         being suitable for use in a second domain of the communications system that is distinct from the first domain;
         being distinct from the first data;
   sending, from the first service server to the second service server, a third message comprising the identifier of the user and requesting to modify the further data;
   converting the modified first data to a format according to the second domain of the communications system;
   storing, in the database server, the converted modified first data in relationship with the further data;
   wherein the sending of the second and third message is responsive to determining:
      by the database server, whether to send the second message based on at least one of the first data and whether the sender of the first message and the first service server are of a same type and are the same server;
      by the first service server, whether to send the third message based on information received about at least one of the first data, the second data, and a type of the data operation.

2. The method of claim 1 wherein the second message further comprises at least one of:
   information relating to the first data before the modifying step;
   information relating to a type of data operation;
   information relating to a second data, stored in relationship with the user, which was not affected by the modifying.

3. The method of claim 2, further comprising, in response to the second message comprising information relating to the second data, selecting, by the database server, the second data based on the first data.

4. The method of claim 1 further comprising selecting, by the database server, the first service server based on the first data.

5. The method of claim 1 further comprising selecting, by the first service server, a protocol for sending the third message based on at least one of a type of second service server or information received in the second message.

6. The method of claim 1, wherein the converting comprises the database server converting.

7. The method of claim 1:
wherein the converting comprises the first service server converting;
further comprising sending, from the first service server to the database server, a fourth message requesting a second data operation to modify data related to the user, the fourth message comprising the converted modified first data.

8. The method of claim 1:
wherein the database server separately stores data related to the user in the first domain and in the second domain;
the method further comprising establishing a link between the first data and the further data;
wherein the converting occurs based on whether the link exists.

9. The method of claim 1, wherein the first and second network domains comprise, respectively, at least one of:
a mobile network circuit-switch domain;
a mobile network packet-switch domain;
an Internet Protocol Multimedia Subsystem domain.

10. A database server comprising:
memory circuitry configured to store data related to a plurality of users of a communications system;
receiver circuitry configured to receive a first message requesting a data operation to modify data related to a user;
processing circuitry configured to:
modify a first data in the memory circuitry, according to the first message, the first data corresponding to the user and suitable for use in a first domain of the communications system;
convert the modified first data to a format according to a second domain of the communications system, the second domain being distinct from the first domain;
store, in the memory circuitry, the converted modified first data in relationship with further data handled by a second service server, the further data being suitable for use in the second domain;
select a second data, stored in relationship with the user and not affected by the modification, based on the first data;
select a first service server of the communications system based on the first data;
transmitter circuitry configured to send, to the first service server, a second message notifying the first service server of the data modification, the second message comprising:
an identifier of the user;
information relating to the first data after modification;
an identifier of the second service server;
information relating to the second data; and
information relating to at least one of the first data before modification and a type of the data operation.

11. The database server of claim 10 wherein the processing circuitry is further configured to determine whether to send the second message based on at least one of:
the first data;
whether the sender of the first message and the first service server are of a same type.

12. The database server of claim 11 wherein the processing circuitry is configured to determine whether to send the second message based on at least one of:
the first data;
whether the sender of the first message and the first service server are the same server.

13. The database server of claim 10:
wherein the memory circuitry is configured to:
separately store data related to the user in the first domain and in the second domain;
link the first data and the further data;
wherein the processing circuitry is configured to convert in response to determining that the link exists.

14. The database server of claim 10, wherein the first and second network domain comprises, respectively, at least one of:
a mobile network circuit-switch domain;
a mobile network packet-switch domain;
an Internet Protocol Multimedia Subsystem domain.

15. A service server for providing a service to users of a communications system by accessing a database server that stores data related to the users so as to obtain and/or modify data stored by the database server, the service server comprising:
receiver circuitry configured to receive, from the database server, a first message notifying the service server about a data modification of a first data corresponding to a user and suitable for use in a first domain of the communications system, the first message comprising:
an identifier of the user;
information relating to the first data after modification;
an identifier of a second service server that handles further data corresponding to the user, the further data being suitable for use in a second domain of the communications system that is distinct from the first domain;
at least one of:
information relating to the first data before modification;
information relating to a type of data operation;
information relating to a second data stored in relationship with the user and not affected by the modification;
processing circuitry configured to:
convert the modified first data to a format according to the second domain;
determine whether to send a second message requesting to modify the further data and comprising the identifier of the user depending on at least one of:
the information received relating to the first data or the second data;
the information relating to the type of the data operation;
select a protocol for sending the second message based on at least one of:
a type of the second service server;
information received in the first message;
transmitter circuitry configured to send:
in response to receiving the first message, the second message to the second service server;
a third message, to the database server, requesting a data modification operation, the third message comprising the converted modified first data.

16. The service server of claim 15, wherein the first and second network domains comprise, respectively, at least one of:
    a mobile network circuit-switch domain;
    a mobile network packet-switch domain;
    an Internet Protocol Multimedia Subsystem domain.

17. A non-transitory computer readable medium storing a computer program product for controlling a database server in a communications system, the communications system comprising the database server and a plurality of service servers, the database server for storing data related to a plurality of users of the system, the plurality of service servers for providing services to the users, wherein a first set of the service servers access to the database server for obtaining and/or modifying data stored therein so as to provide the services they respectively serve, wherein a second set of the service servers handle data related to users provided by a server of the first set on a temporary basis so as to provide control of communication services for the users, the computer program product comprising software code instructions which, when run on the database server, causes the database server to:
    receive a first message requesting a data operation to modify data related to a user;
    modify a first data according to the first message, the first data corresponding to the user and suitable for use in a first domain of the communication system;
    select a second data, stored in relationship with the user and not affected by the modification, based on the first data;
    select a first service server of the first set based on the first data;
    send, to the first service server, a second message notifying the first service server about the data modification, the second message comprising:
        an identifier of the user;
        information relating to the first data after the modifying;
        an identifier of a second service server of the second set that handles further data corresponding to the user, the further data being suitable for use in a second domain of the communications system that is distinct from the first domain;
        information relating to the second data; and
        information relating to at least one of the first data before modification and a type of the data operation;
    convert the modified first data to a format according to the second domain of the communications system;
    store, in the database server, the converted modified first data in relationship with the further data.

18. A non-transitory computer readable medium storing a computer program product for controlling a first service server in a communications system, the communications system comprising a database server and a plurality of service servers, the database server for storing data related to a plurality of users of the system, the plurality of service servers for providing services to the users and comprising the first service server, wherein a first set of the service servers access to the database server for obtaining and/or modifying data stored therein so as to provide the services they respectively serve, wherein a second set of the service servers handle data related to users provided by a server of the first set on a temporary basis so as to provide control of communication services for the users, the computer program product comprising software code instructions which, when run on the service server, causes the service server to:
    receive, from the database server, a first message notifying the service server about a data modification of a first data corresponding to a user and suitable for use in a first domain of the communications system, the first message comprising:
        an identifier of the user;
        information relating to the first data after modification;
        an identifier of a second service server that handles further data corresponding to the user, the further data being suitable for use in a second domain of the communications system that is distinct from the first domain;
        at least one of:
            information relating to the first data before modification;
            information relating to a type of data operation;
            information relating to a second data stored in relationship with the user and not affected by the modification;
    convert the modified first data to a format according to the second domain;
    determine whether to send a second message requesting to modify the further data and comprising the identifier of the user depending on at least one of:
        the information received relating to the first data or the second data;
        the information relating to the type of the data operation;
    select a protocol for sending the second message based on at least one of:
        a type of the second service server;
        information received in the first message;
    send, in response to receiving the first message, the second message to the second service server;
    send, to the database server, a third message requesting a data modification operation and comprising the converted modified first data.

* * * * *

UNITED STATES PATENT AND TRADEMARK OFFICE
CERTIFICATE OF CORRECTION

PATENT NO. : 9,282,143 B2  
APPLICATION NO. : 13/498460  
DATED : March 8, 2016  
INVENTOR(S) : Gomez Maturana et al.

Page 1 of 1

It is certified that error appears in the above-identified patent and that said Letters Patent is hereby corrected as shown below:

In the specification,

In Column 2, Line 48, delete "AASSs" and insert -- ASs --, therefor.

In Column 5, Line 33, delete "23 series/23" and insert -- 23_series/23 --, therefor.

In Column 8, Line 39, delete "2009);" and insert -- 2009), --, therefor.

In Column 10, Line 63, delete "proxyed" and insert -- proxied --, therefor.

In Column 18, Lines 48-49, delete "an structure" and insert -- a structure --, therefor.

In Column 22, Line 25, delete "a equivalent" and insert -- an equivalent --, therefor.

In Column 22, Line 48, delete "well know" and insert -- well known --, therefor.

Signed and Sealed this  
Twenty-sixth Day of July, 2016

Michelle K. Lee  
*Director of the United States Patent and Trademark Office*